United States Patent
Cheng

(10) Patent No.: US 9,615,569 B2
(45) Date of Patent: Apr. 11, 2017

(54) METHODS FOR FORMING ANIMAL DECOYS

(71) Applicant: White Rock Decoys, LLC, La Crosse, WI (US)

(72) Inventor: Lirong Cheng, Shenzhen (CN)

(73) Assignee: White Rock Decoys, LLC, La Crosse, WI (US)

( * ) Notice: Subject to any disclaimer, the term of this patent is extended or adjusted under 35 U.S.C. 154(b) by 119 days.

(21) Appl. No.: 14/736,995

(22) Filed: Jun. 11, 2015

(65) Prior Publication Data

US 2015/0359213 A1 Dec. 17, 2015

(30) Foreign Application Priority Data

Jun. 16, 2014 (CN) ...................... 2014 2 0321100 U

(51) Int. Cl.
| | | |
|---|---|---|
| *A01M 31/06* | (2006.01) | |
| *B29C 49/00* | (2006.01) | |
| *B29C 49/42* | (2006.01) | |
| *B29C 49/48* | (2006.01) | |
| *B29K 23/00* | (2006.01) | |
| *B29L 9/00* | (2006.01) | |
| *B29L 31/00* | (2006.01) | |

(52) U.S. Cl.
CPC ......... *A01M 31/06* (2013.01); *B29C 49/0047* (2013.01); *B29C 49/4273* (2013.01); *B29C 49/48* (2013.01); *B29C 2049/0057* (2013.01); *B29C 2049/4882* (2013.01); *B29K 2023/083* (2013.01); *B29L 2009/00* (2013.01); *B29L 2031/772* (2013.01)

(58) Field of Classification Search
CPC ..................................................... A01M 31/06
USPC ............................................................ 43/2, 3
See application file for complete search history.

(56) References Cited

U.S. PATENT DOCUMENTS

| | | | | |
|---|---|---|---|---|
| 4,023,297 | A * | 5/1977 | Jorgensen | A01M 31/06 43/3 |
| 4,073,397 | A * | 2/1978 | Snodgrass | B65D 81/365 215/385 |
| 4,710,539 | A | 12/1987 | Siadat et al. | |
| 4,821,444 | A | 4/1989 | Remus | |
| 5,003,718 | A * | 4/1991 | Lenert | A01M 31/06 43/3 |
| 5,136,800 | A * | 8/1992 | Lanius | A01M 31/06 43/2 |
| 5,169,697 | A | 12/1992 | Langley et al. | |

(Continued)

FOREIGN PATENT DOCUMENTS

WO    WO -00/07442 A1 * 2/2000
WO    WO2008134656      11/2008

OTHER PUBLICATIONS

Foam Bonding Tapes Information on GlobalSpec, Available on web on or before Jan. 29, 2015, pp. 1-4.

*Primary Examiner* — Jeff Aftergut
(74) *Attorney, Agent, or Firm* — Bell & Manning, LLC

(57) ABSTRACT

This application belongs to the field of methods of forming animal decoys for outdoor usage. The decoys include a main body, which is made of ethylene vinyl acetate material and is collapsible. The main body is made from two sheets of ethylene vinyl acetate material with edges which are attached to each other. At the bottom of the main body, there is a hole to allow air flow.

6 Claims, 9 Drawing Sheets

(56) References Cited

U.S. PATENT DOCUMENTS

| | | | |
|---|---|---|---|
| 5,515,637 A * | 5/1996 | Johnson | A01M 31/06 43/2 |
| 6,177,043 B1 | 1/2001 | Woock | |
| 2002/0020101 A1 * | 2/2002 | Murray | A01M 31/06 43/3 |
| 2004/0197547 A1 | 10/2004 | Bristow et al. | |
| 2008/0222938 A1 * | 9/2008 | Bill | A01M 31/06 43/3 |
| 2009/0165353 A1 * | 7/2009 | Priest | A01M 31/06 43/3 |
| 2010/0132227 A1 | 6/2010 | Pavelescu et al. | |
| 2012/0034459 A1 | 2/2012 | Iwasaki et al. | |
| 2012/0324777 A1 | 12/2012 | Smith | |

\* cited by examiner

METHODS FOR FORMING ANIMAL DECOYS

CROSS-REFERENCE TO RELATED APPLICATIONS

The present application claims priority under the Paris Convention to Chinese Patent Application 201420321100.X, filed Jun. 16, 2014, the entire contents of which are hereby incorporated by reference.

FIELD OF THE INVENTION

The inventions described herein belong to the field of outdoor animal decoys made of ethylene-vinyl acetate copolymers (EVA) and of crosslinked polyethylene (XPE) materials. It is particularly related to hunting decoys shaped like animals or parts of animals.

BACKGROUND

Current large-size plastic hunting decoys on the market mainly use hard polyethylene (PE) as the primary structural material. The shortcomings of these decoys are: a lack of flexibility; they are easily broken; they are not collapsible; their broken sharp edges can cause cuts and other injuries; they lack reliability; and they are inconvenient to store and transport. While it is possible to mold a hunting decoy from less rigid, collapsible materials, the seams in the resulting decoys may easily come apart.

SUMMARY

Methods of forming molded animal decoys are provided. Animal decoys made using the methods are also provided.

One embodiment of a method of forming an animal decoy comprises the steps of: (a) heating a first sheet and a second sheet, each comprising a foam comprising ethylene-vinyl acetate, to a temperature that renders the sheets sufficiently pliable for molding, wherein at least the first sheet has a film of adhesive on a surface; (b) placing the first and second sheets between a first mold part of an animal decoy mold and a second mold part of an animal decoy mold, such that the film of adhesive on the first sheet faces toward the second sheet, wherein each of the first and second mold parts comprises a mold substrate that defines an indentation in the shape of a portion of the animal to be molded; (c) pressing the first and second mold parts together and increasing the air pressure between the first and second sheets relative to the air pressure between each sheet and its corresponding mold part, wherein: (i) the first and second sheets are forced into the indentations in their corresponding mold parts causing them to take on the shape of the indentations; and (ii) the adhesive film on the first sheet comes into contact with the second sheet in a press off area between the mold substrates causing the first and second sheets to become bonded by the adhesive film in the press off area; (d) taking the first and second mold parts apart to release a molded animal model that still includes the bonded press off area; and (e) trimming away the bonded press off area to provide an animal decoy comprising two molded parts bonded together by the adhesive film along the seam between the two molded parts.

Molded animal decoys, such as waterfowl decoys, made using the methods comprise a multipart body, wherein the parts comprise an ethylene-vinyl acetate foam and are bonded together along their seams with an adhesive. At least one interior surface of the molded animal decoys comprises a film of adhesive disposed on at least a portion thereof Other principal features and advantages of the invention will become apparent to those skilled in the art upon review of the following drawings, the detailed description, and the appended claims.

BRIEF DESCRIPTION OF THE DRAWINGS

In order to clearly describe the technical solutions of this invention, the following content will briefly describe the drawings used in the illustration of the embodiments described below. The following drawings represent only a portion of the aspects of this invention. For those of ordinary technical knowledge in this field, with no additional labor that requires creativity involved, one can understand other embodiments based on the following figures.

DETAILED DESCRIPTION

An object of this invention is to overcome the technical shortcomings described above, and provide an outdoor hunting decoy that is easy to store and transport, does not contain any hard materials, is made of environmentally friendly material, meets European Union standards, and is safe and reliable.

The following content will provide a detailed and comprehensive description of the technical solutions using the figures.

Figure 1:
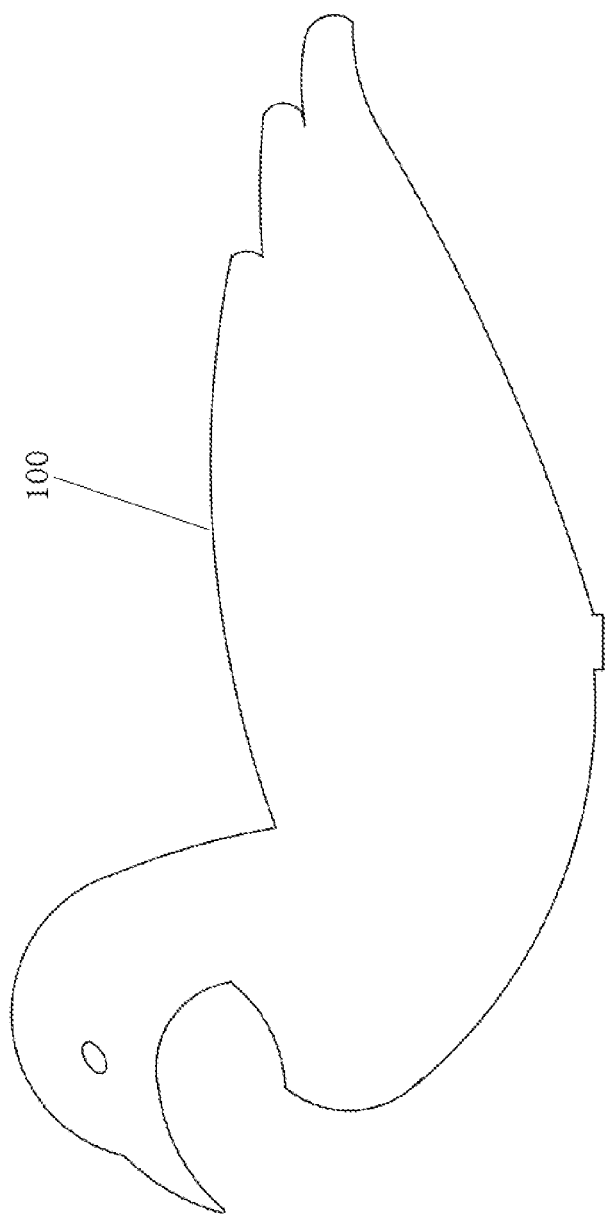
FIG. 1 is the general drawing of an outdoor animal decoys.
Figure 2:
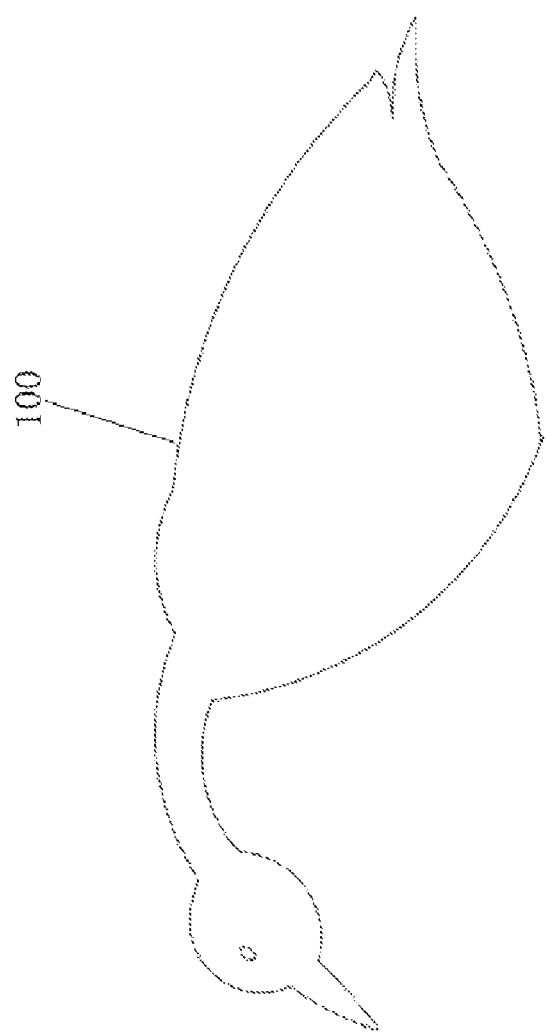
FIG. 2 is the general drawing of another outdoor animal decoy.
Figure 3:
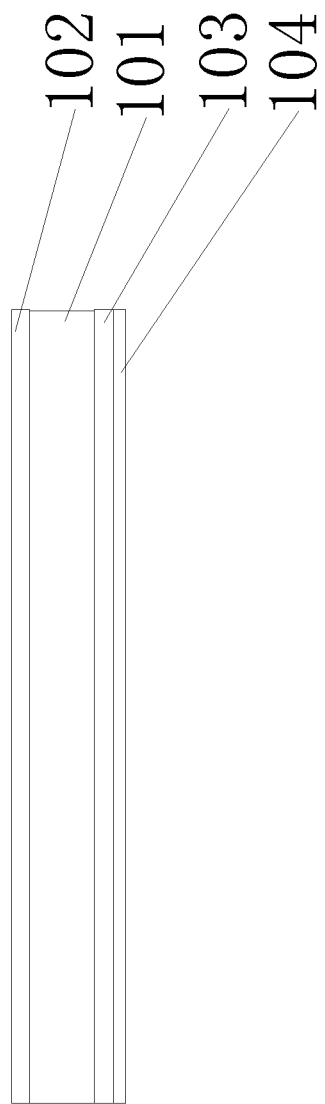
FIG. 3 is a cross-sectional view of a sheet of material used to make the main body of the outdoor animal decoys.

As shown in FIGS. 1, 2, and 3, the outdoor animal models provided herein can be used as decoration, outdoor hunting decoys, such as water fowl decoys, etc. The models can be of entire outdoor animals or of part of the animals' bodies, for instance, animals' horns or animals' heads. The aforementioned models of the outdoor animals contains the main body 100, 200 (see below), which comprises EVA material and is collapsible. The main body 100 can be in the shape of an animal such as, for example, a duck, or a fish, etc. EVA (ethylene-vinyl acetate copolymer; formula $C_6H_{10}O_2$) has features such as being soft, flexible, elastic, and corrosion resistant. The main body 100 is also weather resistant. The main body 100 can last for extended periods when used in an outdoor environment. It is reliable and can be easily folded together for storage and transportation. The main body 100 may have a pattern layer 102 (see below) on its surface. The pattern layer 102 can be completed, for example, through the process of spray painting. Pattern layer 102 can be made in fine details and, thus, give the animal decoys the appearance of real animals. The main body 100 has a hollow structure. For the convenience of manufacturing, the main body 100 can be made from two sheets of EVA (one of which is shown as layer 101) with edges which are attached. The main body 100 has a hole at the bottom, which allows air to be blown into the body. Alternatively, a rubber stopper or a check valve can be installed at the hole. The rubber stopper can be connected to the main body 100 through a plastic strip that is an integrated part of the main body 100, or it can be tied to the main body 100 by a string to prevent it from falling off. Alternatively, the main body 100 is of a solid structure, with EVA filling in the center. In this case, the product can be used without blowing air into the center. Compared to models of outdoor animals which are made of hard PE material, the present animal models may have the following advantages: a) they are more flexible than animal models made from hard PE; b) they can have a glossier surface than animal models made from hard PE; c) they can have more pronounced textures and sharper edges than animal models made from hard PE; d) their painting cost can be lower than that of animal models made from hard PE's, and the effect can be better; e) their cost of transportation and storage can be lower than animal models made from hard PE; f) they can weigh less than animal models made from hard PE, which can make them easier to carry; G) they can float better on the water than animal models made from hard PE.

During actual implementation, XPE material (a cross-linked polyethylene foam which is made from continuous high-temperature foaming of low density polyethylene) can be added to the main body 100. This helps the material to be stretchier (i.e. more flexible) and reduces the amount and sizes of air holes in the material. The main body 100 can be made of a combination of EVA and XPE materials and is collapsible. The main body is of a hollow structure, thus air can be blown in and sucked out of it. An embodiment of a process for manufacturing the animal models includes heating sheet of the material in the oven one or more times (e.g., three times) to allow it to foam and then putting it in a mold on a cold press machine to form its shape. The main body 100 is comprised of two sheets comprised of EVA (layer 101) with edges which are attached. On the inside of the EVA layer 101 there may be a layer of adhesive tape. The adhesive tape may be made of environmentally friendly material. It may be heated to glue the two EVA sheets together firmly. No other adhesive is, therefore, required. Depending on the type of product, EVA fillings can be added to the center of the body.

The surface may then be painted with one or more layers of design patterns. Specifically, the design pattern layer 102 may be completed through the process of spray painting. The EVA material allows the paint to attach to its surface easily, such that the patterns may be detailed and long lasting. The pattern layer 102 may be smooth and glossy surface, with lively design patterns, and may be applied at a low cost. The preferred thicknesses of EVA layer 101 are as follows: preferably, in some embodiments the thickness of the EVA layer 101 is between 2 to 50 millimeters; in some embodiments the thickness of the EVA layer 101 is between 3 to 20 millimeters; in some embodiments the thickness of the EVA layer 101 is between 4 to 12 millimeters; in some embodiments the thickness of the EVA layer 101 is between 5 to 10 millimeters, for instance, 6 or 8 millimeters, etc. Understandably, the thickness of the EVA layer 101 may be determined according to the actual circumstance, and all such thicknesses fall under the description provided herein.

In some embodiments, the EVA fillings may have honeycomb-shape holes to help reduce weight and thus reduce the cost of the product.

In some embodiments, inside the EVA layer 101 there is a layer of a protective coating 103, which enhances the EVA layer's anti-tearing performance. On top of EVA layer 101, which will be the main body layer 100, a transparent fire-resistance layer can be added. This can improve the safety and reliability of the product.

The descriptions mentioned above are illustrative embodiments of the animal models and methods for making them. It should be noted that those of ordinary skill in the art would be able to envision improvements and alternations falling within scope of the claims based on the assumptions and principles of this disclosure.

A summary of some embodiments of the animal models are described in the following enumerated clauses. 1. This disclosure describes models of animal decoys for outdoor usage. The animal models comprise the following features: a main body which is made of an EVA material and is collapsible; the main body comprising painted layers of design patterns; the main body having a hollow structure made from two sheets of EVA material with edges which are attached to each other; at the bottom of the main body, there is a hole to allow air flow. Alternatively, the main body may be solid, with an EVA filling in the center. 2. The model described in clause No. 1 may comprise the following feature: its painted layers of design patterns are completed through the process of spray painting. 3. The model described in clause No. 1 may comprise the following feature: the thickness of its EVA sheets ranges from 2 to 50 millimeters. 4. The model described in clause No. 3 may comprise the following feature: the thickness of its EVA sheets ranges from 3 to 20 millimeters. 5. The model described in the clause No. 4 may comprise the following feature: the thickness of its EVA sheets ranges from 4 to 12 millimeters. 6. The model described in clause No. 5 may comprise the following feature: the thickness of its EVA sheets ranges from 5 to 10 millimeters. 7. All of the models described in clauses No. 1 to No. 6 may comprise the following feature: the EVA filling may have honeycomb-shape holes to help reduce the weight. 8. All of the models described in clauses No. 1 to No. 6 may comprise the following feature: a layer of protective coating may be present inside each EVA layer.

Figure 4:
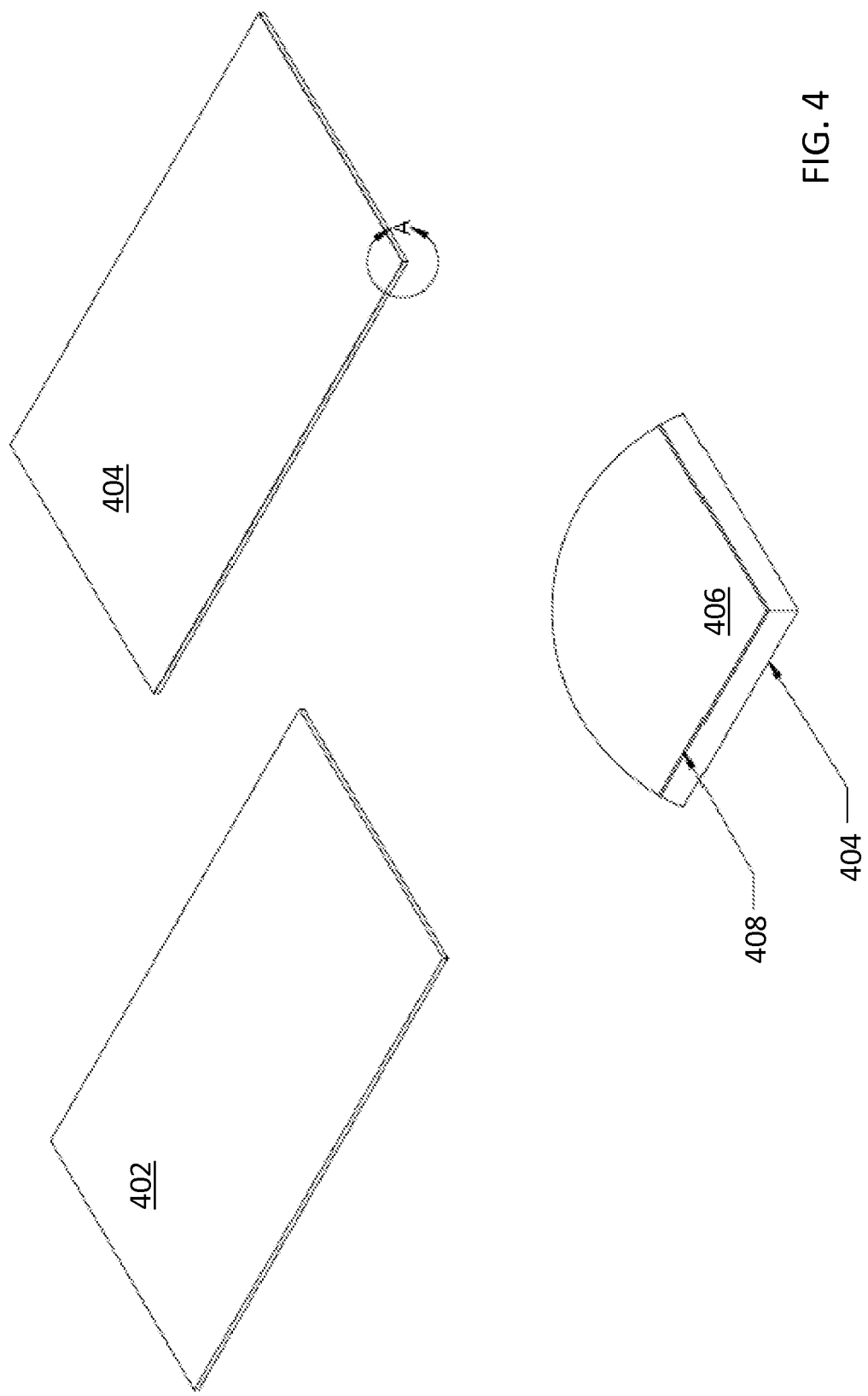
FIG. 4 shows two sheets of foam comprising EVA, including an enlarged view of a corner of one sheet showing a film of adhesive on its surface.

FIG. 4 is a schematic diagram showing two sheets 402, 404 that can be used to form the animal decoys, including an enlarged view of a corner 406 of sheet 404. As shown in enlarged corner 406, one or both of the sheets comprise an adhesive film 408 on their inner surface. The sheets comprise a foam comprising EVA. Optionally, the sheets may further comprise a filler material, such as calcium carbonate. The adhesive film may take the form of a liquid coating of an adhesive that is applied using, for example, a brush or roller, onto the inner surface of sheet 402 and/or sheet 404. Alternatively, the adhesive film may take the form of a tape applied to the inner surface of sheet 402 and/or sheet 404, wherein the tape comprises a thin support substrate and a coating of adhesive. The adhesive film may be applied over the entire inner surface of the foam sheet, or may be applied only around the peripheral portion of the foam sheet. The adhesive may comprise EVA, or may comprise a material other than EVA. It should be noted that, if the adhesive film comprises EVA, it is a distinct component from the EVA foam that makes up the sheets. In particular, EVA-based adhesives do not comprise an EVA foam.

Figure 5:
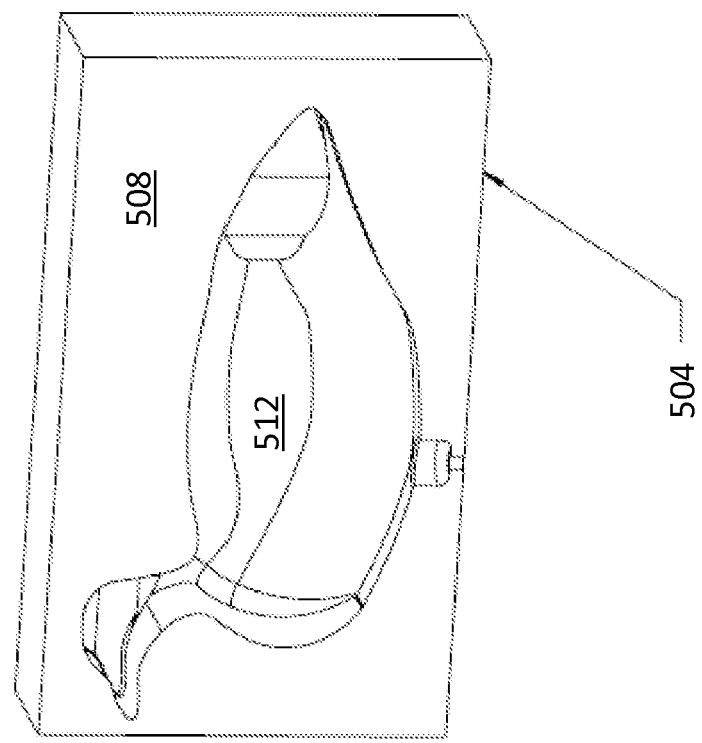
FIG. 5 is a schematic diagram of a two-part duck decoy mold.
Figure 5:
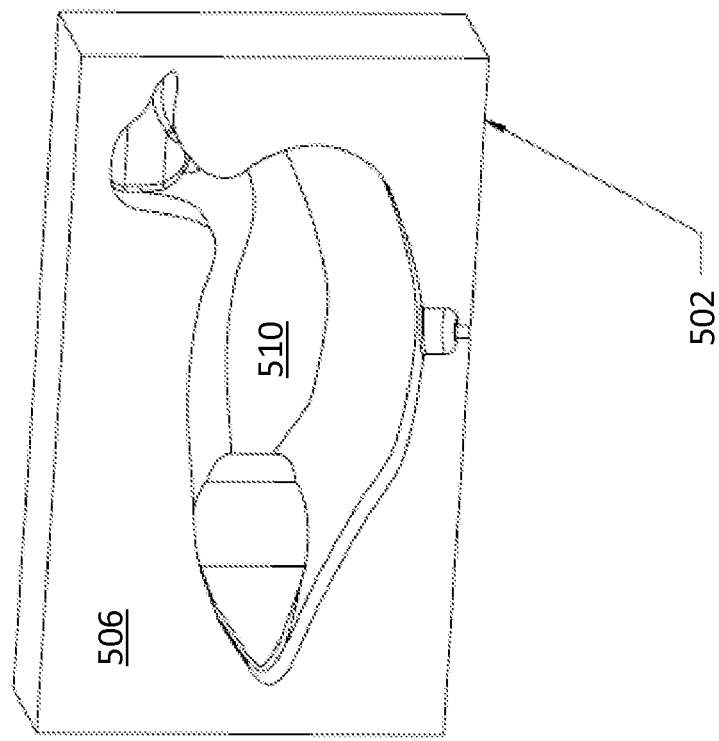

FIG. 5 is a schematic diagram showing two halves of a two-part mold 502, 504 configured to form a duck decoy. Each mold half includes a mold substrate 506, 508 which defines an indentation 510, 512 in the shape of a half of the animal to be molded (here, a duck). Although FIG. 5 illustrates the present methods using a two-part mold, the molds may include more than two parts (for example, three, four, five or more parts), in order to form molded objects having more than two parts bonded together along their seams. In addition, while the methods utilize at least two sheets of a moldable material, they may also utilize a greater number of sheets (for example, three, four, five or more sheets).

Figure 6:
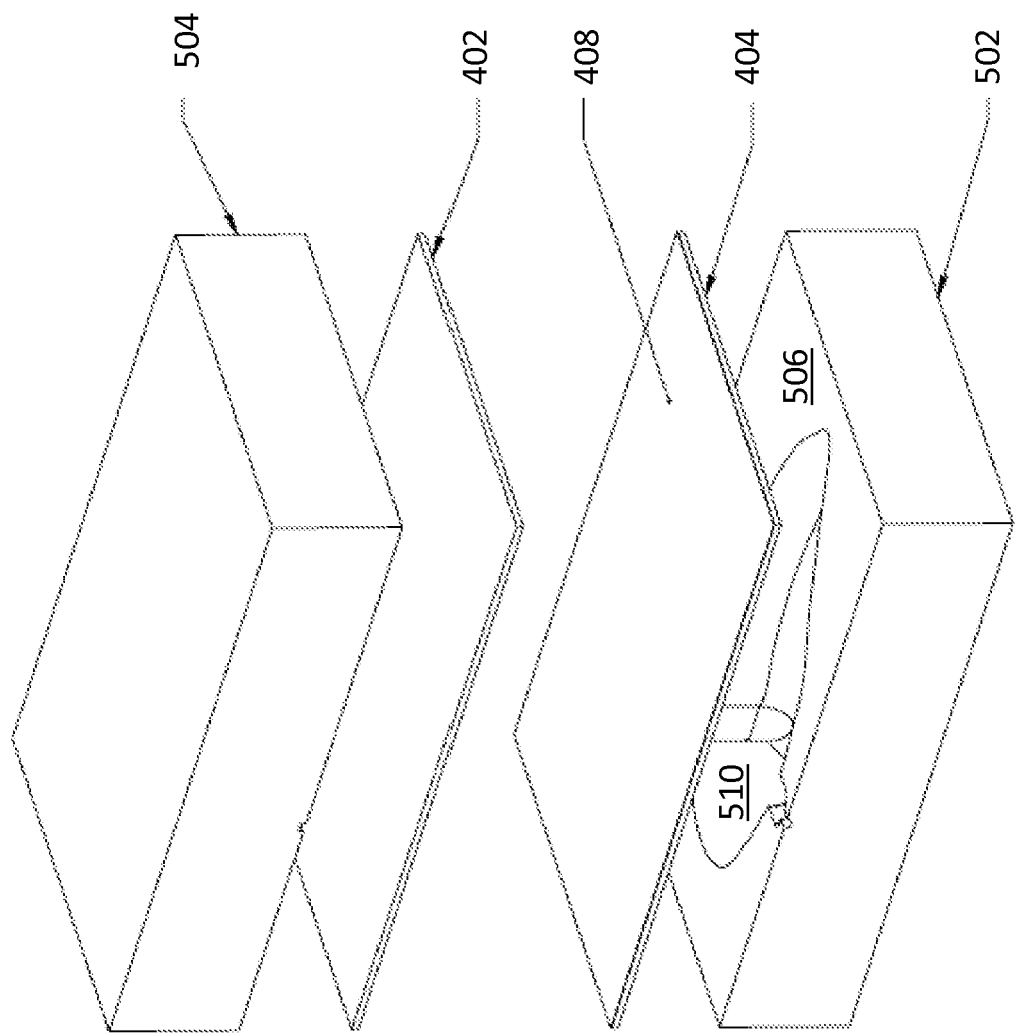
FIG. 6 is a schematic diagram showing two sheets of EVA foam disposed between the two parts of the duck decoy mold.
Figure 7:
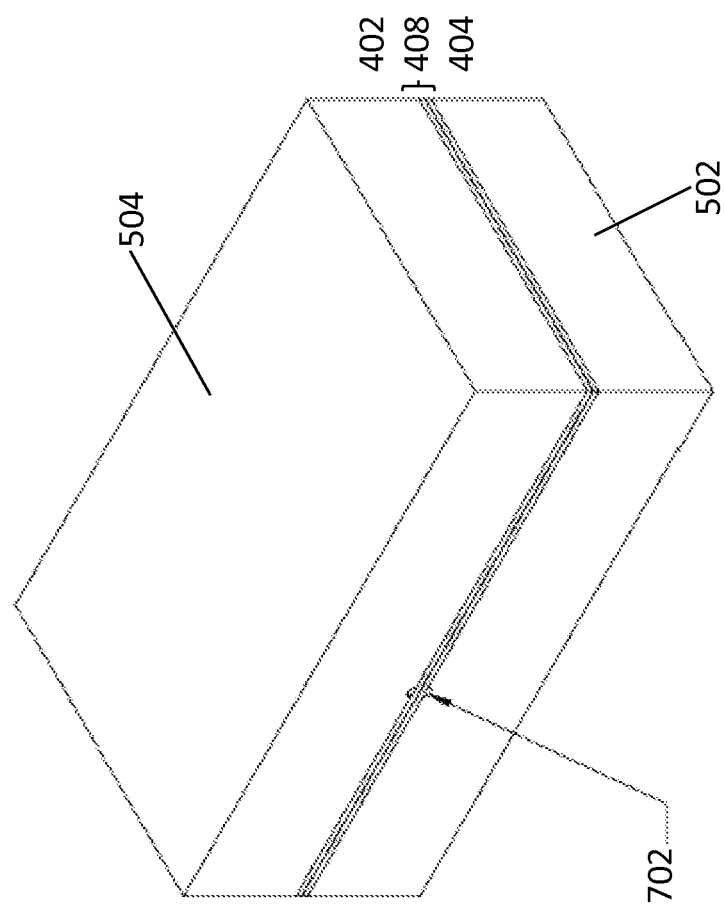
FIG. 7 shows the duck decoy mold of FIG. 6 after the two mold parts are brought together.
Figure 8:
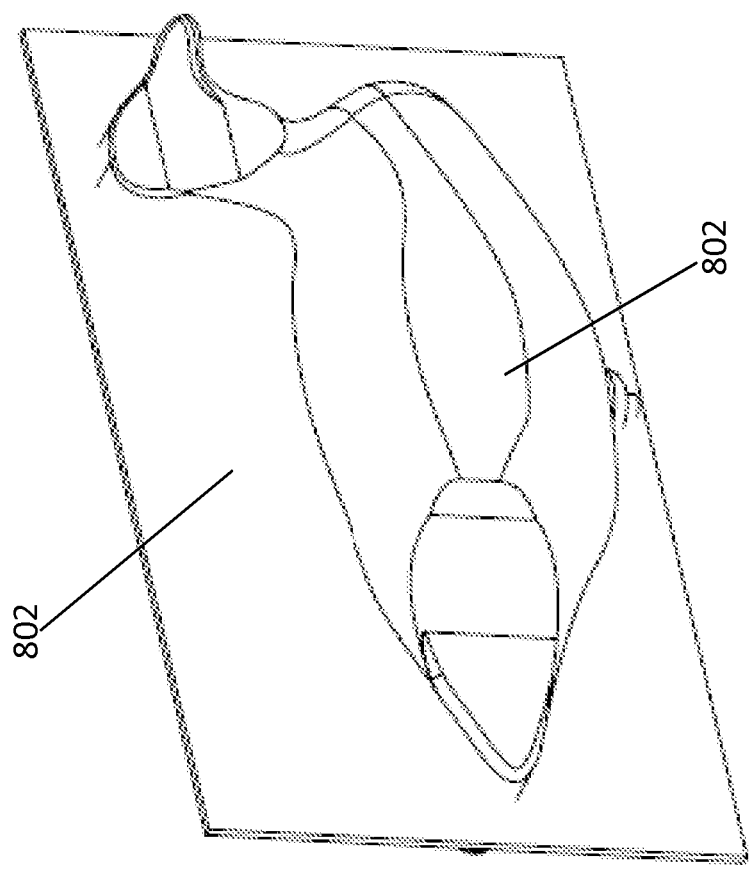
FIG. 8 shows a molded duck decoy, including the bonded press off area, after the molded decoy is released from the two-part mold.
Figure 9:
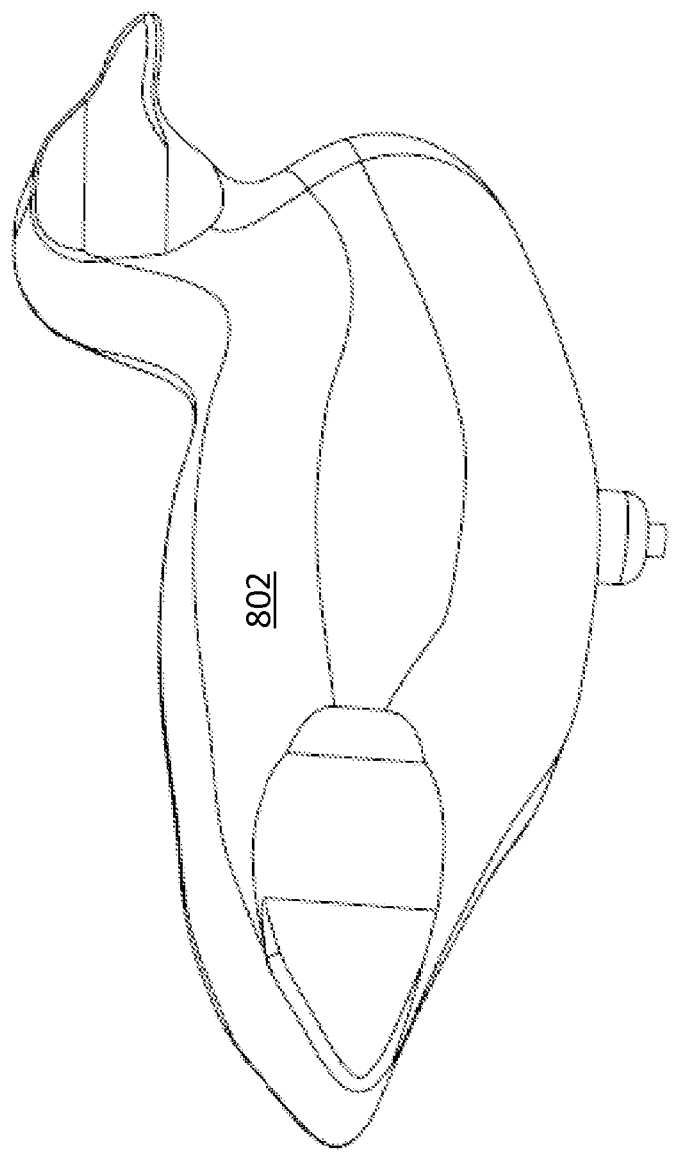
FIG. 9 shows the molded duck decoy after the press off area has been trimmed away.

In an initial step of a method of forming an animal decoy, sheets 402 and 404 are heated to a temperature that renders them sufficiently pliable for molding. Typically the sheets are in the form of a foam when they are heated. However, this heating step can also be used to induce the crosslinking and the foaming of the sheets. The heating also helps the adhesive film to infiltrate the foam. The heating can be carried out, for example, in an oven at a temperature in the range from about 140 to about 180° F. As shown in FIG. 6, an animal decoy is formed by placing foam sheets 402 and 404 between mold halves 502 and 504 with the layer(s) of adhesive 408 facing away from the mold surface and toward the other foam sheet. Mold halves 502 and 504 are then pressed together (FIG. 7) and the air pressure between the foam sheets is increased relative to the air pressure between each sheet and its corresponding mold half This can be accomplished, for example, by introducing compressed air between sheets 402 and 404 through an air inlet port 702 formed between the mold halves. The air forces sheets 402 and 404 into indentations 510 and 512, respectively, causing them to take on the shape of the indentations. (Alternatively, the air pressure between the foam sheets may be increased relative to the air pressure between each sheet and its corresponding mold half by creating a vacuum in the space defined between each sheet and the animal-shaped indentation in its corresponding mold half) Meanwhile, adhesive film 406 on sheet 404 comes into contact with the inner surface of sheet 402 where the two sheets are pressed together between mold substrates 506 and 508. In this matter, sheets 402 and 404 become sealed by adhesive film 406 in the press off area around indentations 510 and 512. As shown in FIG. 8, mold halves 502 and 504 are then taken apart to release a molded animal model (e.g., a duck decoy) 802, which still includes bonded press off area 804. Press off area 804 is then trimmed away (FIG. 9) to provide an animal decoy comprising two molded halves bonded together by an adhesive film along their edges (i.e., along the seam between the two halves). As a result of this molding process, the animal decoys are characterized by a film of adhesive on one or both halves of their interior surface. The decoys are sufficiently mechanically flexible to be reversibly collapsible. That is, they can be folded and compressed into a lower volume, but still regain their initial form upon unfolding and decompression.

Although the molding methods described herein are illustrated by the molding of an animal decoy, other two-part objects can be made using mold halves that define indentations in the shape of one half of the object to be molded.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method of forming an animal decoy, the method comprising:
    heating a first sheet and a second sheet, each comprising a foam comprising ethylene-vinyl acetate, to a temperature that renders the sheets sufficiently pliable for molding, wherein at least the first sheet has a film of adhesive on a surface;
    placing the first and second sheets between a first mold part of an animal decoy mold and a second mold part of an animal decoy mold, such that the film of adhesive on the first sheet faces toward the second sheet, wherein each of the first and second mold parts comprises a mold substrate that defines an indentation in the shape of a portion of the animal to be molded;
    pressing the first and second mold parts together and increasing the air pressure between the first and second sheets relative to the air pressure between each sheet and its corresponding mold part, wherein:
        the first and second sheets are forced into the indentations in their corresponding mold parts causing them to take on the shape of the indentations; and
        the adhesive film on the first sheet comes into contact with the second sheet in a press off area between the mold substrates causing the first and second sheets to become bonded by the adhesive film in the press off area;
    taking the first and second mold parts apart to release a molded animal model that still includes the bonded press off area; and
    trimming away the bonded press off area to provide an animal decoy comprising two molded parts bonded together by the adhesive film along the seam between the two molded parts.

2. The method of claim 1, wherein the adhesive film comprises ethylene-vinyl acetate.

3. The method of claim 1, wherein the second sheet has a film of the adhesive on a surface and the second sheet is placed between the first and second mold parts such that the adhesive film faces toward the first sheet.

4. The method of claim 1, wherein the adhesive film comprises an adhesive tape.

5. The method of claim 1, wherein the adhesive film comprises a coating of a liquid adhesive.

6. The method of claim 1, wherein the first and second sheets further comprise a calcium carbonate filler.

* * * * *